(12) United States Patent
Dose et al.

(10) Patent No.: US 9,789,410 B2
(45) Date of Patent: Oct. 17, 2017

(54) AUTO RESET ZIP LINE

(71) Applicants: Curtis Dose, San Diego, CA (US); John Paul Tierney, Northridge, CA (US)

(72) Inventors: Curtis Dose, San Diego, CA (US); John Paul Tierney, Northridge, CA (US)

(*) Notice: Subject to any disclaimer, the term of this patent is extended or adjusted under 35 U.S.C. 154(b) by 166 days.

(21) Appl. No.: 14/987,297

(22) Filed: Jan. 4, 2016

(65) Prior Publication Data
US 2016/0193535 A1    Jul. 7, 2016

Related U.S. Application Data

(60) Provisional application No. 62/099,803, filed on Jan. 5, 2015.

(51) Int. Cl.
*A63G 21/22*    (2006.01)
*B61H 9/02*    (2006.01)
*F16D 63/00*    (2006.01)
*B61B 7/00*    (2006.01)

(52) U.S. Cl.
CPC ............. *A63G 21/22* (2013.01); *B61B 7/00* (2013.01); *B61H 9/02* (2013.01); *F16D 63/008* (2013.01)

(58) Field of Classification Search
CPC .. A63G 21/22; A63G 21/20; A63G 2031/002; A63G 31/00; B61H 9/02; B61H 1/00; B61B 7/00; B61B 7/02; B61B 11/00; B61B 12/002

USPC ........ 104/112, 113, 115, 173.2, 173.1, 117.1
See application file for complete search history.

(56) References Cited

U.S. PATENT DOCUMENTS

| | | | | |
|---|---|---|---|---|
| 3,713,547 A * | 1/1973 | Beck | ..................... | E21B 19/155 |
| | | | | 104/112 |
| 4,062,293 A * | 12/1977 | Davis | ..................... | A63G 21/20 |
| | | | | 104/113 |
| 5,224,425 A * | 7/1993 | Remington | ............ | A63G 21/20 |
| | | | | 104/113 |
| 8,708,109 B2 * | 4/2014 | Steele | .................... | A63G 21/22 |
| | | | | 104/113 |

* cited by examiner

*Primary Examiner* — Mark Le
(74) *Attorney, Agent, or Firm* — Integrity Patent Group, PLC; Edwin Wold

(57) ABSTRACT

An auto reset zip line assembly comprising a cable running along the circumference of two pulleys that are spaced apart forming a closed loop is provided. A pair of rigid frames are fixedly coupled to the cable at an equal distance from each other. The pulley includes a wheel having a rim that has a continuous trough along the circumference to retain the cable. The wheel is rotatably mounted on a shaft and the shaft is mounted to a hosing. The pulleys include a mechanism to suspend a zip line assembly between two vertical supports. The auto reset zip line assembly further comprises a braking mechanism and a pair of guarding plates coupled to the housing to prevent derailing and entangling of the cable. The invention is advantageous by providing a safe zip line assembly that obviated the need of returning a trolley to the starting point of the zip line.

18 Claims, 2 Drawing Sheets

AUTO RESET ZIP LINE

CROSS REFERENCE TO RELATED APPLICATION

This patent application claims the benefit of U.S. Provisional Patent Application No. 62/099,803, filed Jan. 5, 2015, entitled "Auto Reset Zip Line" the entire teachings and the disclosure of which are incorporated herein by reference thereto.

FIELD OF INVENTION

The present invention is directed to a recreational suspended line transport system commonly known as zip lines and in particular to a downhill zip line system.

BACKGROUND OF INVENTION

Suspended cables between two vertical supports spaced apart have been commonly used to transport objects and persons from one place to another. Commonly known as a zip line, the system is extensively used in rough terrain and hilly areas where the road transport is difficult and time consuming. Having a person ride down these zip line systems has emerged as a popular and adventurous recreation sport. The zip line could be easily deployed in a backyard, parks or hilly terrains etc. Typically, the recreational suspension cable transport includes a cable suspended between two vertical supports, such that one end of the cable is at a higher position with respect to the other and a trolley could slide downhill under gravity towards the lower end of the cable. Further, an elevated platform is usually provided to climb up and grab the trolley resting at the higher position of cable. The trolley is usually a frame having pulleys engaged with cable and body for housing a rider. Beside the trolley, suspended seats and frame with pulleys engaged with cable and handle that could be grabbed by the rider are also commonly used. The suspension cable system could be easily installed in the backyard or a park between trees or pillars. The sport is more adventurous when installed across river bodies or canyons. Further, the zip line is provided with a suitable braking mechanism that slows down the person approaching the end of the zip line and safely lands the person on the ground.

There are numerous patented and produced recreational zip line designs on the market. However, the recreational zip lines of the prior art are based on a common design, i.e. a suspended cable and trolley that slides downhill on the cable under gravity. Such a design of trolley moving downhill towards the end of a zip line has a disadvantage that on completion of each ride, the trolley system must be pulled back up to the upper starting point, or detached and carried back up to the starting point then reattached to the cable. Riders in line at the top must wait for the trolley to be reset to the top so they can ride. In addition, since the trolley slides along the stationary cable, there is significant danger that while sliding, the fingers, hair, or clothing of the rider can become tangled in the trolley wheels or the stationary cable, causing injury to the rider. In addition, it is common for a lighter rider to come to a stop on the wire before reaching the lower station. Ride operators have to ride backwards up the wire, hand over hand, to grab the rider's trolley and pull him or her into the lower station-a scary situation that further slows down the ride.

Therefore, a need exists for an improved zip line apparatus that is safe in use and allows multiple users to enjoy the sport without waiting for the trolley to return.

SUMMARY OF THE INVENTION

An auto reset zip line assembly comprising a cable running along the circumference of two pulleys that are spaced apart forming a closed loop is disclosed. A pair of rigid frames are fixedly coupled to the cable at an equal distance from each other. The pulley includes a wheel having a rim that has a continuous trough along the circumference to retain the cable. The wheel is rotatably mounted on a shaft and the shaft is mounted to a hosing. The pulleys include means to suspend a zip line assembly between two vertical supports. The auto reset zip line assembly further comprises a braking mechanism and a pair of guarding plates coupled to the housing to prevent derailing and entangling of the cable. The invention is advantageous by providing a safe zip line assembly that obviated the need of returning a trolley to the starting point of the zip line.

It is an object of the present invention to provide a moving zip line having pulleys at each end for making it easy for operators to reel in a lighter rider that has stalled short of a lower station.

BRIEF DESCRIPTION OF THE DRAWINGS

To further clarify various aspects of some example embodiments of the present invention, a more particular description of the invention will be rendered by reference to specific embodiments thereof, which are illustrated in the appended drawing. It is appreciated that the drawing depicts only illustrated embodiments of the invention and are therefore not to be considered limiting of its scope. The invention will be described and explained with additional specificity and detail through the use of the accompanying drawing in which.

DETAIL DESCRIPTION OF THE INVENTION

Figure 1:
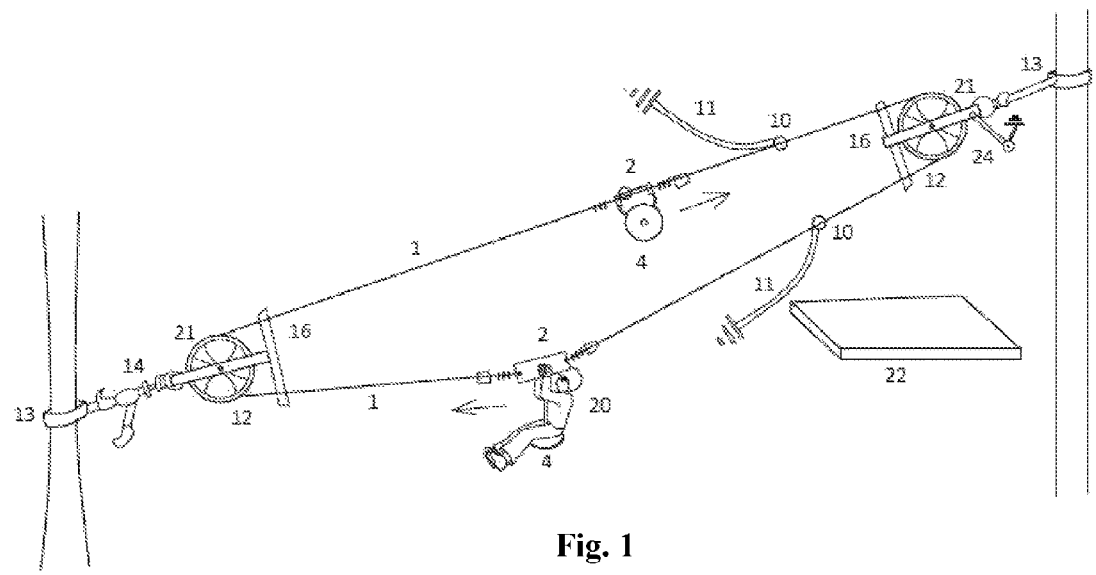
FIG. 1 is the perspective view of zip line assembly showing the rider descending down under gravity.
Figure 2:
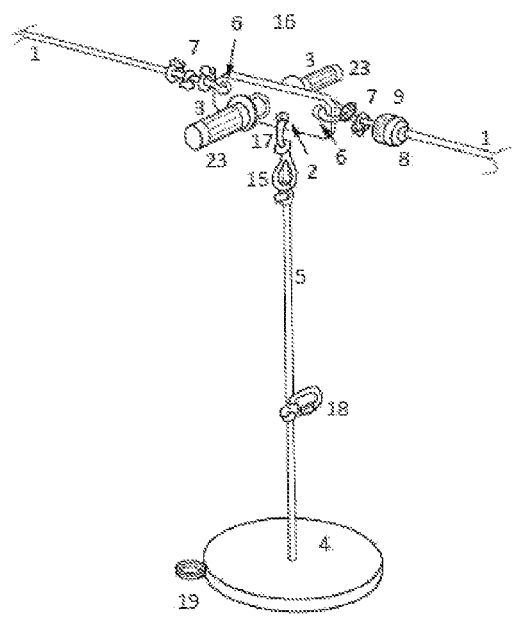
FIG. 2 shows a seat suspended from the rigid frame, a pair of handles coupled to the rigid frame and the ends of two cables connecting to the rigid frame.
Figures 3A, 3B:
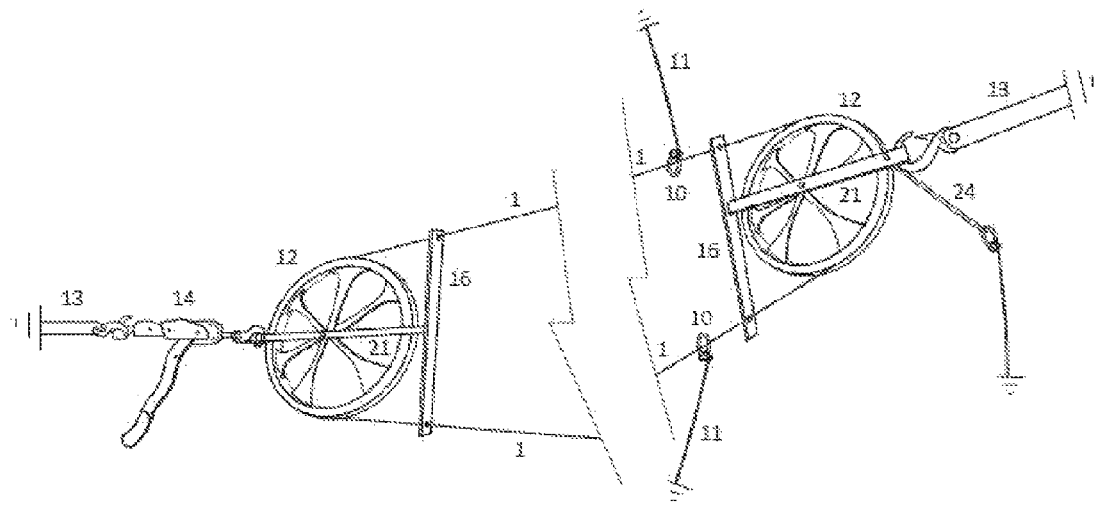
FIG. 3A is the perspective view of bottom pulley and further showing suspending means and guarding plate.
FIG. 3B is the perspective view of upper pulley and further showing suspending means, rotation restrictor, guarding plate, and a pair of bungee cords.

The present invention provides a zip line assembly for use in transporting a person downhill under gravity. Referring to FIG. 1, showing a child riding down the zip line, the zip line includes two equal-length 3/16 in. galvanized steel cables 1. The opposite ends of cable are coupled to a pair of rigid frame 2 and similarly the other cable is coupled to the same rigid frames, thus forming a continuous loop. The rigid frame more clearly shown in FIG. 2 includes a pair of handles 3 on opposite sides of the rigid frame. The handle could be a metal tube that is welded to the rigid frame and the metal tube could further include rubber or leather gripping adapted to be grabbed by a person riding on zip line. Further, as shown in FIGS. 1 & 2 is a seat 4 suspended from the rigid frame through a rope 5. Such an arrangement allows a person sitting on the seat and grabbing the handles with both hands to ride down the zip line. The rigid frames include two holes on opposite sides that permit a thimble 6 to pass through the holes. The thimble couples the cable to the rigid frame. The cable loop is secured using 3/16 in. wire clamps 7. However, the cable could be coupled to the rigid frame using any other method obvious to a skilled person. Further, as shown in FIG. 2 a rubber cushioning 8 is provided near the rigid frame and is secured to the cable using a hose clamp 9.

Figure 4:
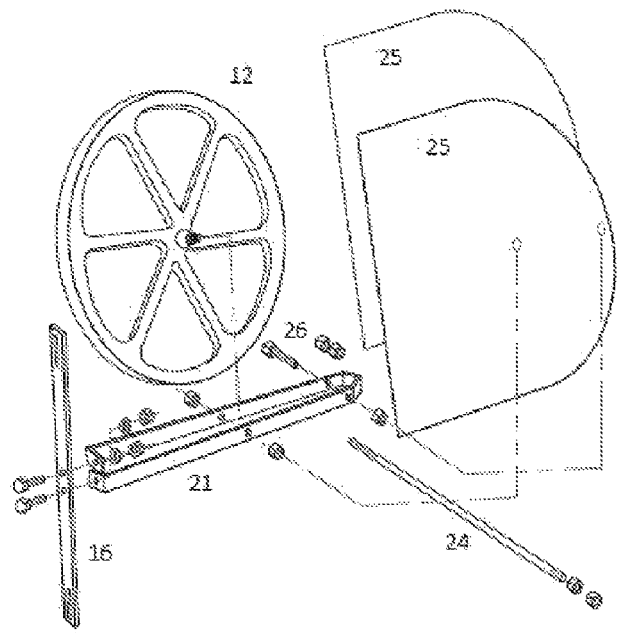
FIG. 4 is the exploded view of the pulley with guarding plate, side plates, and rotation restrictor.

The rubber cushioning engages with the braking pulley 10, which is connected to the bungee cord 11. The pulley and bungee cord function as a breaking mechanism to slow down the user riding on the zip line and safely land the user on the ground. The rubber cushioning engages with the braking pulley, which then moves with the cable and stretches the bungee cord, resulting in slowing down of the rider. As shown in the FIG. 1, the zip line includes a pair of bungee cords connected to pulleys on the upper portion of the cables. The other end of a bungee cord is anchored to a solid support. As the rider approaches the end of the ride at the bottom, the other seat approaches the upper pulley and the rubber cushioning adjacent to the other seat engages with the braking pulley that stretches the bungee cord slowing down the user. The length of the bungee cord is such that the braking pulley stops before hitting the guarding plate 16. The cable runs along the circumference of two pulleys 12 that are spaced apart forming a continuous loop. Before the pulley, a guarding plate 16 is used to keep the cable aligned with the pulleys and prevent the cable from derailing due to any shock, in particular when a user jumps off the seat while still in the air. Further, the guarding plate prevents cushioning rubber and the rigid frame to ride on the pulley and possibly derail. The guarding plate includes two slots on opposite end portions and the cable could pass through the slots. The length and breadth of slot are such that the cable while normal operation of zip line does not touch the guarding plate. The pulleys are 25 in. diameter and the both pulleys could be similar in dimension. The pulley shown in FIG. 4 includes a wheel having a continuous trough along the circumference of the wheel to retain the cable. The wheel could be mounted on a shaft or axle and the shaft is coupled to the housing. The housing of the pulley includes a pair of faceplates 21 positioned on the opposite side of the wheel and the faceplate includes a mounting mechanism for the shaft. Two holes are provided in the faceplate through which the screw portion of the shaft protrudes outwards and the shaft is secured using nuts. The shaft can include bearings to smoothen the rotation of the wheel on the shaft and it is obvious that the shaft and wheel could include any mechanism known to a skilled person for reducing friction between the shaft and wheel. The opposite ends of faceplate include flange portions or the plate could be bent inwards to form the flange portion. The flange portions of opposite plates could overlap and the overlapped portion could be secured using fasteners. In the figure, each faceplate is bent slightly in opposite directions at the end for coupling the guarding plate. The guarding plate is secured to the housing using a pair of nut and bolt. Further shown in the FIG. 4 is a pair of shields 25 that could be positioned on opposite sides of the wheel and secured to the housing. The shields can be used to prevent tree branches, flags, or fingers being inserted into the rotating pulley spoke and the shields could be made of plastic or metal.

The housing further includes a rotation restrictor 24, which is an elongated rod coupled to the upper pulley. The rotation restrictor ensures that the upper pulley returns to a horizontal position in the direction that does not entangle the two cables. At rest, the pulleys are horizontally aligned with seats on left and right side of the pulley. On occupying the seat by the rider, the pulley is vertically aligned due to weight of the user with occupied seat at bottom and the vacant seat at top. As the user vacates the seat at the bottom, the pulleys tend to align horizontally. Here, the rotation restrictor limits the rotation angle of the pulley i.e. 180 degrees, which ensures that the pulley does not turn to an angle that the cable and bungee cords may entangle. The rotation restrictor 24 is a 3/8 in. rod used at the anchor end of the upper pulley faceplate 21, instead of the normal bolt 26 used in this position in the bottom pulley faceplate 21. The outer end of the rotation restrictor is attached to a light bungee or wire or rope that keeps the upper pulley from rotating past vertical in each direction, so the upper pulley always returns to the same horizontal alignment as the rider vacates the lower seat. In the absence of the rotation restriction, and when the rider gets off the seat, it may happen that the upper pulley might rotate in the wrong direction, crossing the two cables and entangling the two bungees. This is especially likely if the finishing user hops off the lower seat while still in the air, which sends a major shock to the zip line assembly and the seat could fly through the air and over the other cable.

The pulley includes a suspension mechanism to suspend the pulleys through a vertical support, such as a tree. Shown in FIG. 1 are tow straps 13 that are wrapped around tree trunks at the top and bottom and coupled to the pulley assemblies with hooks. At either the top or the bottom of the ride, a come-a-long wire retractor 14 is inserted between the tow strap and the pulley assembly to take up the slack in the wire during installation, and proper tension the ride. An advantage of the tow strap 13 anchors and come-along 14 is that the anchor point can be easily moved up or down the tree or other solid attachment, to make adjustments to the departure and arrival rider 20 height above the ground or platform 22. Once the Zip Line is sized, constructed, tested, and working properly, the come-along 14 and tow strap 13 loops allow it to be quickly taken down and stowed still assembled. Then it is equally fast to hook it back up in the same location, and pulls it into the proper tension.

It is to be understood that the zip line assembly encompasses a variety of alternatives. For example, the cable could be stainless steel cable with anti-rust coating, or galvanized steel cables etc. Similarly, the pulley housings could be made of metal and could be of any shape and size, for example the housing may substantially shield the wheel. Moreover, the seat or trolley system could be any structure obvious to a skilled person for suspending a person from the zip line. The length and height of the zip line could be varied as desired by the user. Furthermore, the zip line could be used for industrial and recreation purposes, for example, the zip line could be used to transport objects such as persons, utility items, cargo, buckets etc. The seat suspension length shown in FIG. 2 could be shortened for smaller riders by hooking the link 18 to a hook 15. After the rider gets off the seat at the bottom, the empty seat 4 can be stowed more compactly by hooking the ring 19 on hook 15. In addition, the security of the rider as shown in FIG. 1 i.e. rider 20 could be increased by using a safety harness coupled to the hook 15. Moreover, the additional braking mechanism could be provided on either or both rotating pulleys to slow or stop the ride as desired, or the bungee cord could be replaced by other braking mechanism obvious to a skilled person for use on zip lines.

Furthermore, the zip line assembly may encompass following design alternatives and adaptations. Using stainless steel cables would provide greater rust protection. Greater safety, especially for younger riders 20, can be achieved by the rider 20 wearing a climbing harness and snapping it into the connector link 2 snap link 15. The harness could be clipped into the snap link 15 to ride back up the hill with the seat 4. Safety can also be enhanced by the rider wearing a helmet. The helmet could be clipped into the snap link 15 to ride back up the hill with the seat 4. A braking mechanism could be added to the cables 1 or pulleys 12. For example, a bicycle friction brake assembly could be added to the lower or upper pulley 12 (bicycle wheel) to clamp down on the spinning wheel rim and slow the rider's 20 descent. Larger seats or even multiple seats could be added to larger Zip Lines. Instead of a rider 20, the Zip Line could have suspended buckets, bins, or platforms to quickly and efficiently move equipment, cargo, or material from a high point to a lower point. The larger upper and lower pulleys 12 could further improve connector link 2 clearances between the other wire 1 and the other connector link 2, especially on shorter zip lines. In another embodiment, the housing comprises two elongated faceplates positioned on both sides of the wheel. The opposite ends of the faceplate are bent inwards to form a flange and the opposite faceplates could couple through the flanges.

In another embodiment, the zip line assembly comprises a pair of equal-length cables, each cable having two opposite ends and the two opposite ends are coupled to two rigid frames. Similarly, the two ends of the other cable are coupled to the two rigid frames and both the cables forming a closed continuous loop. The continuous loop of cable could run along the circumference of two pulleys spaced apart. In yet another embodiment, the zip line further comprises a pair of seats suspended from the two rigid frames through a flexible or rigid line, and a pair of handles is coupled to each of the rigid frames, such that a person could sit on the seat while holding the pair of handles with both hands. In still yet another embodiment, the zip line assembly could be suspended from two vertical supports spaced apart, and one of the pulleys is mounted at elevated position with respect to other pulley permitting a user occupying the seat to ride down under gravity towards the bottom pulley. The zip line further comprises a braking mechanism configured to slow down the user approaching the bottom pulley and safely land the user on the ground. The invention is advantageous by allowing the empty seat to be automatically and simultaneously reaching the upper start position as the occupied seat reaches down to the end position. As a rider goes down on one seat, the other seat is lifted back up to the start position. There is no conflict between seats as they pass in the middle because the seat and cable with the rider's weight hangs lower than the cable with no rider. A braking pulley is included on each cable at the top, with a bungee cord attached to the pulley and other end of bungee cord anchored to a rigid support. As the rider approaches down, the empty seat goes up, and on reaching the top, the cushioning provided near the rigid frame engages with the braking pulley. The braking pulley slides with the up-going seat and stretches the bungee cord, which tend to slow down the movement of the cable and thus the slowing down the rider approaching the bottom end of the ride, safely landing the rider on the ground. That rider gets off the zip line at the bottom and another rider can immediately get on the other seat at the top and immediately ride the Zip Line assembly to the bottom, and again and again. There is no need to stop and pull a seat back up to the starting point.

It will be understood that implementations are not limited to the specific components disclosed herein, as virtually any components consistent with the intended operation of a method and/or system implementation for a zip line may be utilized. Accordingly, for example, although particular zip lines and zip line mechanisms may be disclosed, such components may comprise any shape, size, style, type, model, version, class, grade, measurement, concentration, material, weight, quantity, and/or the like consistent with the intended operation of a method and/or system implementation for zip lines and zip line mechanisms may be used. In places where the description above refers in particular implementations of zip lines and zip line mechanisms, it should be readily apparent that a number of modifications may be made without departing from the spirit thereof and that these implementations may be applied to other zip lines and zip line mechanisms. The accompanying claims are intended to cover such modifications as would fall within the true spirit and scope of the disclosures set forth in this document. The presently disclosed implementations are, therefore, to be considered in all respects as illustrative and not restrictive, the scope of the disclosure being indicated by the appended claims rather than the foregoing description. All changes that come within the meaning of and range of equivalency of the claims are intended to be embraced therein.

What is claimed is:

1. A zip line assembly for transporting an object downhill under force of gravity, said zip line assembly comprising:
    a) a pair of pulleys, each said pulley comprising a wheel having a continuous trough along the circumference of said wheel, the wheel being rotatably mounted on a shaft, said shaft being mounted in a housing, said housing comprising a proximal face and a distal face;
    b) a cable running along the circumferences of said pair of pulleys spaced apart forming a continuous loop;
    c) suspension means adapted to suspend the pulleys, said suspension means being coupled to the proximal faces of the housings;
    d) a guarding plate coupled to the distal face of the housing, said guarding plate having slots on opposite ends, the slots being configured to permit said cable to pass through;
    e) a pair of rigid frames fixedly coupled to the cable, said pair of rigid frames coupled to the cable at equal distances from each other of the rigid frames; and
    f) a support member fixedly coupled to at least one of said rigid frames, said support member adapted to suspend said object.

2. The zip line assembly according to claim 1, wherein said zip line further comprises a brake means, said brake means adapted to slow down and safely land the object on ground.

3. The zip line assembly of claim 1, wherein said object is a person, said support member is a pair of handles adapted to be grabbed by the person, and said zip line further comprises a seat suspended from one of the rigid frames and configured to accommodate the person in sitting position.

4. The zip line assembly of claim 1, wherein said object is a person, said support member is an elongated handle, said handle is adapted to be grabbed by the hands of said person.

5. The zip line assembly of claim 1, wherein said object is a cargo.

6. The zip line assembly of claim 1, wherein said zip line is suspended from a pair of vertical supports using the suspension means, said vertical supports are spaced apart, and one of the pulleys is suspended at elevated position with respect to the other pulley.

7. The zip line assembly of claim 6, wherein one of said vertical supports is a tree trunk.

8. The zip line assembly of claim 1, wherein said zip line assembly further comprises a rotation restrictor, said rotation restrictor limits the rotation of at least one of said pulleys to a predetermined angle range.

9. The zip line assembly of claim 1, wherein said cable is a galvanized steel cable.

10. The zip line assembly of claim 1, wherein said housing is a pair of metal plates, each said metal plate is bend near an end forming a flange, said pair of plates coupled to each other at said flanges.

11. A zip line assembly for transporting an object downhill under the force of gravity, said zip line assembly comprising:
   a) a pair of pulleys, each said pulley comprising a wheel having a continuous trough along the circumference of wheel, the wheel being rotatably mounted on a shaft, said shaft being mounted in a housing, said housing comprising a proximal face and a distal face;
   b) a pair of substantially equal-length cables, each said cable having opposite ends, said opposite ends of one of said cables coupled to a pair of rigid frames, said opposite ends of the other one of said cables coupled to said pair of rigid frames forming a continuous loop, said loop running along the circumferences of said pair of pulleys spaced apart;
   c) suspension means adapted to suspend one of the pulleys, said suspending means is coupled to the proximal face of the housing;
   d) said pair of rigid frames fixedly coupled to the cables, said pair of rigid frames coupled to the cables at equal distances from each other of the rigid frames;
   e) a support member fixedly coupled to each said rigid frame, said support member adapted to suspend the object.

12. The zip line assembly according to claim 11, wherein said zip line further comprises a brake means, said brake means adapted to slow down and safely land the object on ground.

13. The zip line assembly of claim 11, wherein said object is a person, said support member is a pair of handles adapted to be grabbed by the person, and said zip line further comprises a seat suspended from one of the rigid frames and configured to accommodate the person in sitting position.

14. The zip line assembly of claim 11, wherein said object is a cargo.

15. The zip line assembly of claim 11, wherein said zip line is suspended from a pair of vertical supports using the suspension means, said vertical supports are spaced apart, and one of the pulleys is suspended at elevated position with respect to the other pulley.

16. The zip line assembly of claim 15, wherein at least one of said vertical supports is a tree trunk.

17. The zip line assembly of claim 11, wherein said zip line assembly further comprises a rotation restrictor, said rotation restrictor limits the rotation of at least one of said pulleys to a predetermined angle range.

18. The zip line assembly according to claim 11, wherein said zip line further comprises a guarding plate coupled to the distal face of one of the housings, said plate having slots on opposite ends, the slots are configured to permit one of said cables to pass through.

\* \* \* \* \*